United States Patent Office 2,779,766
Patented Jan. 29, 1957

2,779,766

PYRROLES HAVING AMINO, CYANO, AND MERCAPTO OR SUBSTITUTED MERCAPTO GROUPS AND THEIR PREPARATION

William J. Middleton, Claymont, Del., assignor to E. I. du Pont de Nemours and Company, Wilmington, Del., a corporation of Delaware No Drawing. Application April 20, 1955,
Serial No. 502,714

20 Claims. (Cl. 260—313)

This invention relates to new substituted pyrroles and to their preparation. More particularly this invention relates to new substituted pyrroles which have attached to nuclear carbon amino, cyano and sulfur containing groups and to methods for their preparation.

Pyrrole is a five-membered nitrogen-containing heterocyclic compound which contains two nuclear carbon-to-carbon unsaturations. The compound has somewhat unexpected properties in that it and its unsaturation resemble that of benzenoid compounds in many respects. The pyrrole nucleus occurs in natural products such as in the porphyrins of chlorophyll and hemoglobin. Although pyrroles have interesting properties, investigations heretofore have been directed to pyrroles having carboxylic acid and hydrocarbon groups attached to nuclear carbons.

It is an object of this invention to provide new substituted pyrroles and processes for their preparation. A further object is to provide new substituted pyrroles which have attached to nuclear carbon, amino, cyano and sulfur containing groups and methods for their preparation. A still further object is to provide useful products which are derivatives of tetracyanoethylene and tetracyanoethane. Other objects will appear hereinafter.

These and other objects of this invention are obtained by providing substituted pyrroles in which one of the nuclear carbon atoms bonded to nuclear nitrogen bears an amino group and the other nuclear carbon atom bonded to nuclear nitrogen bears a group selected from the class consisting of mercapto and organic substituted mercapto groups, one of the remaining nuclear carbon atoms bears a cyano group and the other remaining nuclear carbon atom bears a group which is directly bonded thereto by carbon which is further bonded solely to from one to two elements of atomic number 7 to 8 and is multiply bonded to one of these elements. These new substituted pyrroles thus have attached to nuclear carbon, an amino group, a divalent sulfur atom singly bonded to nuclear carbon and at least one cyano group. The new substituted pyrroles of this invention have the structural formula $$\begin{array}{c} R_3-C\underline{\phantom{XX}}C-R_2 \\ \parallel\phantom{XXXXXX}\parallel \\ H_2N-C\diagdown\phantom{X}\diagup C-S-R_1 \\ N \\ | \\ R \end{array}$$

wherein R is hydrogen or hydrocarbon, preferably lower alkyl of 1 to 4 carbon atoms, $R_1$ is hydrogen, hydrocarbon or substituted hydrocarbon which in general has up to 7 carbons with or without oxygen, particularly hydroxyhydrocarbon such as hydroxyalkyl, or R and $R_1$ together form a hydrocarbon chain, i. e., an alkylene group such as the ethylene group, at least one of $R_2$ and $R_3$ is cyano and the other is either cyano or a group which is derived from cyano, said cyano group being directly bonded to nuclear carbon of the pyrrole ring by a carbon atom which is further bonded solely to elements of atomic number 7 to 8, i. e., nitrogen and oxygen, and is multiply bonded to at least one of these elements, Groups $R_2$ and $R_3$, of which at least one is cyano, include the cyano group, —CN, carbalkoxy groups, —COO alkyl, particularly where alkyl is the lower alkyls of 1 to 4 carbon atoms, the carbamyl group, —CONH$_2$, and the alkoxycarbimido groups and their hydrochloride salt groups, —C(NH)O alkyl·HCl, particularly the lower, 1 to 4 carbon, alkoxycarbimido groups.

New substituted pyrroles within the scope of this invention are obtained by the base catalyzed rearrangement of substituted thiophenes in which each of the nuclear carbon atoms bonded to sulfur bears an amino group and each one of the other nuclear carbon atoms bears a cyano group followed by acidification, or optionally, alkylation. These cyano-containing diaminothiophenes and their preparation are more fully disclosed in my U. S. patent application, Serial No. 493,551, filed March 10, 1955 and have the structural formula

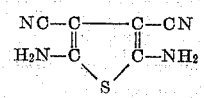

New substituted pyrroles of this invention are also obtained by the decomposition, at elevated temperatures and optionally in the presence of an acid, of a substituted butadiene in which each of the terminal carbon atoms of the butadiene nucleus bears an amino group and an aromatic mercapto group, including aryl and substituted aryl mercapto groups, and each of the central carbon atoms of the butadiene nucleus bears a cyano group. These substituted butadienes are 1,4-diamino-2,3-dicyano-1,4-di(substituted mercapto)butadienes of the formula

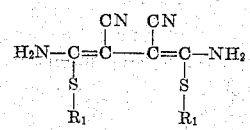

wherein $R_1$ is an aryl hydrocarbon or a substituted aryl hydrocarbon radical. Preparation of substituted butadienes of this formula are disclosed in my U. S. patent application, Serial No. 491,512, filed March 1, 1955.

The pyrroles thus obtained by either of the above methods have an acidic hydrogen on the nuclear pyrrole nitrogen. This can be converted to a salt group by treatment with a base, such as an alkali metal hydroxide. They can be alkylated by suitable alkylating reagents. The alkylation may be effected at the time the pyrroles are obtained by the above methods if alkylating reagents are present. When a mercapto group is present, it forms salts and is alkylated before the hydrogen on the pyrrole nitrogen is replaced. One of the cyano groups on the pyrrole ring can be converted to its derivatives such as by hydrolysis to the amide or by reaction with alcoholic hydrogen chloride. The latter gives the alkoxycarbimido hydrochloride which upon hydrolysis produces the carboxylic ester.

The following examples in which the parts are by weight illustrate the preparation and properties of new substituted pyrroles within the scope of this invention.

EXAMPLE I

*2-amino-3,4-dicyano-5-mercaptopyrrole by rearrangement of 2,5-diamino-3,4-dicyanothiophene*

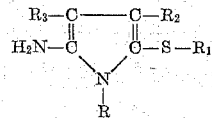

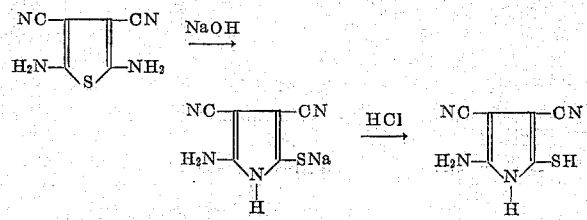

A mixture of 3.28 parts of 2,5-diamino-3,4-dicyanothiophene, 25 parts of water, and about 50 parts of 10% sodium hydroxide was heated under reflux until all solid had gone into solution. The solution, which had become very dark, was cooled, treated with decolorizing charcoal, and then filtered. The filtrate was acidified with hydrochloric acid, and the precipitate which formed was collected on a filter, washed with water, and redissolved in 5% sodium bicarbonate solution. The resultant solution was treated with decolorizing charcoal again and filtered, and the filtrate was acidified with 5% hydrochloric acid. The precipitate which formed was collected on a filter and washed with water. There was obtained 2.0 parts (61% yield) of 2-amino-3,4-dicyano-5-mercaptopyrrole in the form of a white powder which began to decompose without melting at 220° C.

*Anal.*—Calcd. for $C_6H_3N_3S$: C, 43.90; H, 2.46. N, 34.13; S, 19.48; N Eq., 164.18. Found: C, 43.96; H, 2.66; N, 34.10; S, 19.43; N. Eq., 198.

The same compound was also obtained by refluxing the thiophene in 25% methylamine solution for thirty minutes followed by acidification.

A sample of this compound dissolved in alcohol decolorized an aqueous iodine solution, indicated the presence of a free mercapto group, which was converted to the disulfide as follows: To a solution of 12.0 parts of 2-amino-3,4-dicyano-5-mercaptopyrrole in 250 parts of 5% sodium bicarbonate solution was added dropwise a solution of 7.5 parts of iodine and 15 parts of potassium iodide in 75 parts of water. The orange-brown precipitate which formed was collected on a filter, washed with water, and recrystallized from alcohol-water after treatment with decolorizing charcoal. There was obtained 9.0 parts of bis-(5-amino-3,4-dicyano-2-pyrryl)disulfide in the form of bright orange needles which decomposed when heated above 280° C. A very dilute acetone solution gave a very intense purple color with one drop of 5% cupric acetate solution.

*Anal.*—Calcd. for $C_{12}H_6N_8S_2$: N, 34.34; S, 19.65. Found: N, 34.40; S, 19.81.

EXAMPLE II

*2 - amino - 3,4 - dicyano-5 - (beta-hydroxyethylmercapto) pyrrole by alkylation*

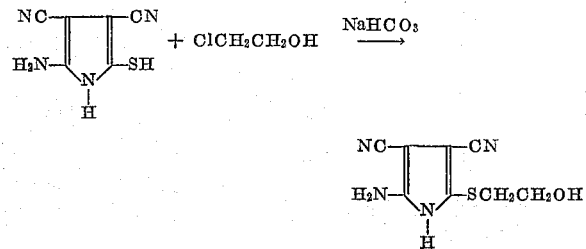

A solution of 1.64 parts of 2-amino-3,4-dicyano-5-mercaptopyrrole (Example I) and 1.61 parts of beta-chloroethanol in 20 parts of 5% sodium bicarbonate solution was heated under reflux for ten minutes and then cooled. The crystals which separated were collected on a filter, washed with water, and dried. There was obtained 1.5 parts of light brown plates. These were recrystallized from water to give near-white plates, M. P. 186–187° C. The 2-amino-3,4-dicyano-5-(beta-hydroxyethylmercapto)pyrrole was insoluble in cold water, but dissolved readily in 10% sodium hydroxide.

*Anal.*—Calcd. for $C_8H_8N_4OS$: C, 46.18; H, 3.87; N, 26.91; S, 15.40; N. Eq. 208.23. Found: C, 46.17; H, 3.91; N, 26.52; S, 15.47; N. Eq., 218; pKa (alcohol), 9.4.

EXAMPLE III

*2-amino-3,4-dicyano-5-phenylmercaptopyrrole from the disubstitutedmercaptobutadiene*

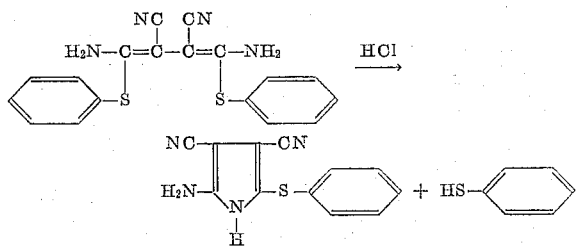

A solution containing 100 parts of water and 13 parts of concentrated hydrochloric acid was added to a solution of 7.0 parts of 1,4-diamino-2,3-dicyano-1,4-di-(phenylmercapto)butadiene in 80 parts of hot ethyl alcohol, and the resultant solution was heated under reflux for ten minutes and then filtered. The filtrate was diluted with 150 parts of water and allowed to cool. The white, flaky precipitate which formed was collected on a filter, washed with water, and dried. There was obtained 4.55 parts (95%) of 2-amino-3,4-dicyano-5-phenylmercaptopyrrole. A sample recrystallized from ethyl alcohol-water, M. P. 233–234° C., was obtained as white needles.

*Anal.*—Calcd. for $C_{12}H_8N_4S$: C, 59.98; H, 3.38; N, 23.34; S, 13.34. Found: C, 60.02; H, 3.51; N, 23.17; S, 13.47.

The same compound was formed by heating 1,4-diamino-2,3-dicyano-1,4-bis(phenylmercapto)butadiene for ten minutes in an ethylene glycol vapor bath (197° C.).

EXAMPLE IV

*2-amino-3,4-dicyano-5-methylmercaptopyrrole by sulfur alkylation of 2-amino-3,4-dicyano-3-mercaptopyrrole with methyl iodide*

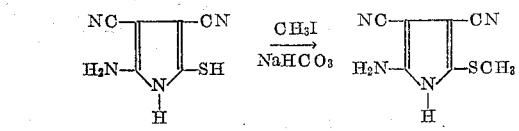

A solution of 5 parts of 2-amino-3,4-dicyano-5-mercaptopyrrole in 50 parts of 5% sodium bicarbonate solution was shaken vigorously for five minutes in a stoppered bottle with about 57 parts of methyl iodide. A yellow precipitate formed. The bottle was cooled and the precipitate (4.3 parts) was collected on a filter, washed with water, and recrystallized from alcohol-water. There was obtained 3.5 parts of 2-amino-3,4-dicyano-5-methylmercaptopyrrole in the form of white needles, M. P. 224–226° C.

*Anal.*—Calcd. for $C_7H_6N_4S$: C, 47.18; H, 3.39; N, 31.54; S, 17.99. Found: C, 47.34; H, 3.43; N, 31.51; S, 18.28.

EXAMPLE V

*2-amino-3,4-dicyano-5-benzylthiopyrrole by alkylation*

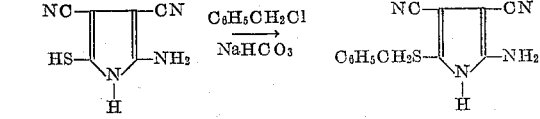

2,5-diaminо-3,4-dicyanothiophene (24.6 parts) was dissolved in a hot solution of 30 parts of sodium hydroxide pellets in 375 parts of water. When solution of the thiophene was complete, cracked ice was immediately added bringing the volume to approximately 1000 parts. The solution was acidified with concentrated hydrochloric acid, filter aid was added, and the yellow-white percipitate of 2-amino-3,4-dicyano-5-mercaptopyrrole was collected on a filter and washed with water. The precipitate was digested with 450 parts of 10% sodium bicarbonate solution, the mixture treated with decolorizing charcoal, and filtered. The clear, yellow filtrate was diluted with water to a volume of 700 parts.

To the above filtrate was added, dropwise with stirring, a solution of 19 parts of benzyl chloride in 160 parts of methanol. The bulky yellow-white precipitate which formed was collected on a filter and washed successively with water, 1:1 methanol-water, and benzene. The crude product was recrystallized without drying from 1:1 methanol-water mixture. There was obtained 29.7 parts (78% yield) of 2-amino-3,4-dicyano-5-benzylthiopyrrole as white prisms, which melted with decomposition at 213–214° C.

*Anal.*—Calcd. for $C_{13}H_{10}N_4S$: C, 61.41; H, 3.96; N, 22.04; S, 12.59; N. E., 254.2. Found: C, 61.63; H, 3.90; N, 21.92; S, 12.74; N. E., 279.4.

The infrared spectrum had bands at 2.9, 2.95, 3.1 and $3.15\mu$ for NH and $NH_2$; at 4.48 and $4.52\mu$ for CN; at 6.05, 6.25, 6.55 and $6.7\mu$ for $NH_2$, pyrrole ring, and aromatic ring.

EXAMPLE VI

*2-amino-3,4-dicyano-5-carboxymethylmercaptopyrrole monohydrate by alkylation*

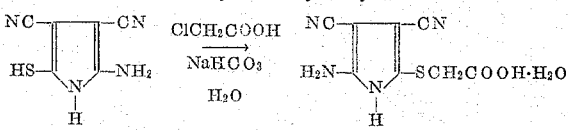

2,5-diamino-3,4-dicyanothiophene (3.28 parts) was dissolved in a hot solution of 5 parts of sodium hydroxide pellets in 75 parts of water. The dark colored solution was immediately cooled in ice and filtered. The filtrate was acidified with concentrated hydrochloric acid to precipitate 2-amino-3,4-dicyano-5-mercaptopyrrole. A filter aid was added and the precipitate was collected on a filter and washed with water. The material on the filter was digested with 60 parts of 5% sodium bicarbonate solution and the mixture filtered. To the filtrate was added a solution of 3.78 parts of chloroacetic acid in excess aqueous sodium bicarbonate solution. The resulting solution was heated on a steam bath for several minutes, cooled, and acidified with hydrochloric acid. No precipitate formed at first, but when the acidified mixture was filtered, crystals rapidly formed in the filter flask. These were collected on a filter and washed with water. Recrystallization from hot water, after treatment with a decolorizing charcoal, gave 2.68 parts (55.8%) of 2-amino-3,4-dicyano-5-carboxymethylmercaptopyrrole monohydrate as light straw-colored needles, which melted with decomposition at 201–203° C.

*Anal.*—Calcd. for $C_8H_6O_2N_4S \cdot H_2O$: C, 40.0; H, 3.33; N, 23.4; S, 13.3; N. E. (—COOH), 240.2; (>NH+COOH), 120.1. Found: C, 41.34; H, 3.38; N, 24.10; S, 13.68; N. E., (—COOH) 245; (>NH+COOH), 120, pKa (—COOH), 3.60; (>NH), 9.12.

EXAMPLE VII

*1-methyl-2-amino-3,4-dicyano-5-benzylmercaptopyrrole by alkylation*

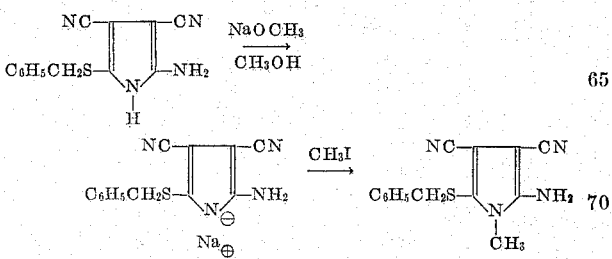

2-amino-3,4-dicyano-5-benzylthiopyrrole (5.08 parts) and 1.08 parts of sodium methoxide were dissolved in 20 parts of absolute methanol. Methyl iodide (5.68 parts) was added and the mixture refluxed for ten minutes. The reaction mixture was cooled, and poured into 100 parts of ice water. The oil which separated solidified when subjected to reduced pressure in a vacuum desiccator. The solid was collected on a filter, washed successively with water and benzene, and dried in a vacuum desiccator. There was obtained 4.55 parts (85%) of light tan powder. The crude product was dissolved in 20 parts of absolute methanol and poured through 20 parts of activated alumina contained in a burette. The column was washed with methanol. The total filtrate was heated to boiling, and an equal volume of hot water added. Crystals formed on cooling and these were collected on a filter, washed successively with 1:1 methanol-water and benzene, and dried in a vacuum desiccator. There was obtained 1.71 parts of tan prisms which started to melt at 166° C. Recrystallization from methanol-water mixture, followed by treatment with decolorizing charcoal, gave 0.94 part of white needles, M. P. 181–183° C. A further recrystallization from methanol-water gave 0.65 part of 1-methyl-2-amino-3,4-dicyano-5-benzylmercaptopyrrole as long colorless needles, M. P. 183–184° C., insoluble in sodium hydroxide solution.

*Anal.*—Calcd. for $C_{14}H_{12}N_4S$: C, 62.68; H, 4.51; N, 20.89. Found: C, 62.47; H, 4.64; N, 21.00 20.88.

The infrared spectrum had bands at 2.9, 2.95, and $3.1\mu$ for $NH_2$; $4.55\mu$ for CN; and at 6.05, 6.25, 6.35, 6.6 and $6.7\mu$ for $NH_2$, aromatic and pyrrole unsaturation.

EXAMPLE VIII

*2-amino-carbonamido-cyano-5-methylmercaptopyrrole*

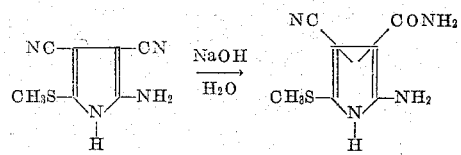

2-amino-3,4-dicyano-5-methylthiopyrrole (1.78 parts) was dissolved in a solution of 2.40 parts of sodium hydroxide in 25 parts of water. The solution was heated to reflux for four hours, cooled, and acidified with hydrochloric acid. The precipitate which formed was collected on a filter and washed with water. Recrystallization from hot water, followed by treatment with decolorizing charcoal, gave 0.68 part (35% yield) of 2-amino - carbonamido - cyano - 5 - methylmercaptopyrrole as pink needles melting with decomposition at 230–231°. A mixed M. P. with the starting material gave a depression (mixed M. P. at 190° dec.).

*Anal.*—Calcd. for $C_7H_8ON_4S$: C, 42,86; H, 4.11; N, 28.56; S, 16.32. Found: C, 42.95; H, 4.09; N, 28.52; S, 16.23.

The infrared spectrum of a sample obtained after two recrystallizations from water (M. P. 234–5° dec.) had bands at 2.9, 2.95, 3.0, and $3.25\mu$ for $NH_2$ and NH; at $4.55\mu$ for CN; and at 6.05, 6.15, 6.35, 6.55, 6.65, and $6.7\mu$ for $NH_2$, amide CO, conjugated C=C and C=N.

EXAMPLE IX

*2-amino-ethoxycarbimidohydrochloride-cyano-5-methylmercaptopyrrole*

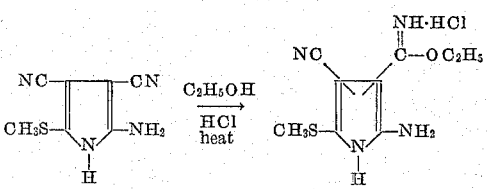

A solution of 3.56 parts of 2-amino-3,4-dicyano-5-methylmercaptopyrrole in 80 parts of anhydrous ethanol and 80 parts of anhydrous ether was placed in a 3-necked flask fitted with a reflux condenser, mercury sealed stirrer, and gas inlet tube. Dry hydrogen chloride was bubbled through the solution with stirring and without external heating for thirty minutes. The solution was then heated to reflux and introduction of hydrogen chloride was continued for an additional forty-five minutes. The reaction vessel was cooled in ice. No precipitates formed when a few drops of the reaction mixture were diluted with water. The solvent was removed by evaporation over a steam bath under anhydrous conditions. The yellow solid residue was triturated with benzene, collected on a filter, and washed with benzene. There was obtained 4.09 parts of 2-amino-ethoxycarbimidohydrochloride-cyano-5-methylmercaptopyrrole as a yellow powder which melted with decomposition at 234–238° C.

Anal.—Calcd. for $C_9H_{13}ON_4SCl$: C, 41.3; H, 4.98; N, 21.5; S, 12.3; Cl, 13.6. Found: C, 40.49; H, 4.39; N, 23.45; S, 13.57.

EXAMPLE X

*Alkylation of both SH and NH groups*

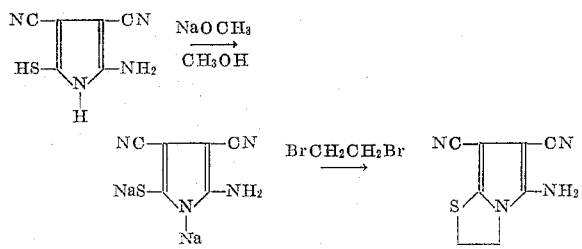

2-amino-3,4-dicyano-5-mercaptopyrrole (15.3 parts) was converted to the disodium salt by dissolving in a solution of 10.2 parts of sodium methoxide in 40 parts of absolute methanol. Ethylene dibromide (17.7 parts) was added in one portion. The mixture was refluxed over a steam bath for five minutes and then cooled. The crystals which had separated from solution were collected on a filter, washed with methanol, and dried in a vacuum desiccator. There was obtained 11.5 parts (65%) of light tan crystalline powder. The crude product was dissolved in about 200 parts of dimethylformamide and the solution poured through 100 parts of activated alumina in a column. The colorless forerun was collected separately and diluted with an equal volume of boiling water. On cooling, crystals separated and these were collected on a filter, washed successively with 1:1 dimethylformamide-water, water, and methanol, and dried in a vacuum desiccator. There was obtained 2.0 parts of long light pink needles, insoluble in sodium hydroxide solution, M. P. above >300°. Recrystallization from dimethylformamide-water, after treatment with decolorizing charcoal, give 1.3 parts of long, very light pink needles, insoluble in most organic solvents.

Anal.—Calcd. for $C_8H_6N_4S$: C, 50.53; H, 3.18; N, 29.47; S, 16.83. Found: C, 51.21; H, 3.45; N, 29.51, 29.48; S, 17.06.

The infrared spectrum had bands at 2.95, 3.0, and 3.1$\mu$ for $NH_2$; at 4.5$\mu$ for CN, and at 6.0, 6.3, 6.5, and 6.75$\mu$ for C=C and/or C=N.

The products of this invention are 2-amino-5-mercapto- (or substituted mercapto)pyrroles which have at least one cyano group in the 3 or 4 position and the remaining 3 or 4-position having a carbon-containing group directly bonded to the pyrrole nucleus by carbon whose remaining valences are satisfied by one to two elements of atomic number 7 to 8. Also included in the scope of this invention are the salts, particularly the alkali metal salts, of these new pyrroles.

The compounds of this invention can be obtained by different methods as shown in the preceding examples. The preferred method involves the base-catalyzed rearrangement of a cyano-containing diaminothiophene of the formula,

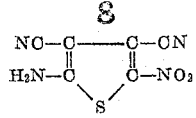

followed by acidification, or optionally alkylation. The reaction is carried out at a pH of 8 or above and is facilitated by elevated temperature, preferably 65–100° C. The base can be either organic, e. g., an amine, or inorganic, e. g., an alkali metal hydroxide or carbonate. The rearrangement is readily brought about in aqueous medium. The resulting pyrrole is generally soluble in the aqueous medium since the mercapto and nucleus —NH groups form salts with bases.

The thiophenes employed in the above-described reaction with basic compounds are obtained by the reaction of a water-soluble inorganic sulfide under basic conditions with tetracyanoethylene or tetracyanoethane. For example, 2,5-diamino-3,4-dicyanothiophene can be prepared as disclosed and claimed in my U. S. patent application, Serial No. 493,551 filed March 10, 1955, as follows:

A cooled solution of 12.0 parts of sodium sulfide decahydrate in 100 parts of water was mixed rapidly with a solution of 6.5 parts of tetracyanoethane in 24 parts of acetone. The solution immediately became light orange in color and a pink precipitate began to form. The precipitate was collected on a filter, washed with water, and dried. The material was dissolved in dimethylformamide, treated with decolorizing charcoal, filtered and after addition of water, light pink needles separated. There was obtained 2.0 parts of 2,5-diamino - 3,4 - dicyanothiophene which sublimed at 240–244° with some decomposition.

Tetracyanoethylene can be prepared as disclosed in Cairns and Graef U. S. patent application Serial No. 382,842, filed September 28, 1953, by reaction of sulfur monochloride with malononitrile as in the following procedure:

Sulfur monochloride (70 parts) was added slowly during the course of six hours to a refluxing solution of 33 parts of malononitrile in about 600 parts of chloroform. After the mixture refluxed for an additional 20 hours, the chloroform was removed by heating on a steam bath. The crystalline residue was extracted with diethyl ether in a Soxhlet extractor. Evaporation of the ether extract gave crude tetracyanoethylene which was further purified by sublimation at 100° C. under a pressure of 1–2 mm.

Tetracyanoethane can be prepared as disclosed in Heckert U. S. patent application Serial No. 421,977, filed April 8, 1954, now abandoned, of which Serial Number 496,329, filed March 23, 1955 is a continuation-in-part, by reduction of tetracyanoethylene, e. g., a solution of 19.2 parts of tetracyanoethylene in about 60 parts of acetone was cooled in an ice bath and about 30 parts of mercaptoacetic acid added. The white needles obtained were recrystallized from acetone/water solution.

An alternate process involves the decomposition, with loss of mercaptan, of a 1,4-diamino-1,4-di(arylmercapto)butadiene which has cyano groups in the 2 and 3 positions. The substituted butadiene has the structure

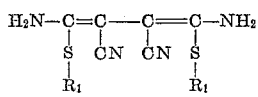

wherein the $R_1$ groups are aromatic, preferably aryl of up to 7 carbons. The conversion of the above substituted open chain dienes to the pyrroles of this invention are brought about by the use of heat and/or acid. Temperatures of the order of 65–200° C. are most useful with the presence of a mineral acid and a hydroxylated solvent generally expediting the reaction.

The open chain butadienes employed are obtained by the action of an aryl mercaptan ($R_1SH$) on tetracyanoethylene or tetracyanoethane. For example 1,4-diamino-2,3-dicyano-1,4-bis(phenylmercapto)butadiene can be prepared as disclosed in my U. S. patent application, Serial No. 491,512, filed March 1, 1955 as follows:

A solution of 6.5 parts of tetracyanoethane in 15 parts of acetone was mixed with a mixture of 22.0 parts benzenethiol and 50 parts of 10% sodium hydroxide solution. The reaction mixture became warm. After the reaction mixture had cooled to room temperature it was poured into 200 parts of water. The light yellow oil which separated solidified upon standing. The solid was collected on a filter, washed with water, and dried. There was obtained 12.3 parts (70% yield) of 1,4-diamino-2,3-dicyano-1,4-bis(phenylmercapto)butadiene in the form of a very light yellow powder. This material was recrystallized from ethyl alcohol to give white prisms, M. P. 150° C.

In a similar manner 1,4-diamino-2,3-dicyano-1,4-bis(ortho-aminophenylmercapto)butadiene can be prepared by the reaction of tetracyanoethane and o-aminobenzenethiol as follows:

A solution of 6.5 parts of tetracyanoethane in 15 parts of acetone was mixed with a mixture of 25.0 parts of o-aminobenzenethiol in 50 parts of 10% sodium hydroxide. The oil which separated solidified to form a light yellow solid upon standing. The solid was collected on a filter, washed with water, and recrystallized from ethyl alcohol. There was obtained 16.0 parts of 1,4-diamino-2,3-dicyano-1,4-bis(o-aminobenzenemercapto)butadiene in the form of white needles, M. P. 166–170° C. Further recrystallization from alcohol produced white needles, M. P. 172–173° C.

Furthermore, as shown in the preceding examples, reaction of the pyrroles which have hydrogen on the sulfur or pyrrole nitrogen with alkylating agents gives the corresponding substituted mercapto or the N-derivative. When the —SH group is present it is more acidic than the >NH group and is more easily alkylated. Thus stepwise salt formation and alkylation can be effected.

Pyrroles with hydrogen on either or both of the nuclear nitrogen or the sulfur are acidic. These hydrogens can be replaced by cations from a base, e. g., alkali metal, alkaline earth, ammonium, or basic amine cations. In general, the compounds which have a —SH group are soluble in sodium bicarbonate while those that have only hydrogen on pyrrole nitrogen are soluble in an alkali that is stronger than sodium bicarbonate.

The products of this invention can be employed in a variety of uses. They can be employed as accelerators in the curing of synthetic rubber. They exhibit developing action for photographic use, particularly those having hydrogen on sulfur and nitrogens. They are chelating agents and can be employed, for example, to remove copper from solution.

They form highly colored derivatives on reaction with aromatic aldehydes which products are useful as dyes and colors for fabrics and plastics. For example, the amino group of 2-amino-3,4-dicyano-5-benzylmercaptopyrrole can be converted to the benzylidene amino group by the following procedure: A mixture of 2-amino-3,4-dicyano-5-benzylmercaptopyrrole and excess of benzaldehyde was heated on an oil bath at 140–150° C. for fifteen minutes (until evolution of water ceased). The pyrrole dissolved completely to form a yellow solution. The mixture was cooled and diluted with benzene. Light yellow crystals separated. These were collected on a filter, washed with benzene and dried under vacuum. There was obtained a 92% yield of light yellow plates which upon recrystallization from chlorobenzene gave light yellow needles, M. P. 173–173.5° C. The product was soluble in dilute aqueous potassium hydroxide, acetone, and methanol.

*Anal.*—Calcd. for $C_{20}H_{14}N_4S$: C, 70.16; H, 4.12; N, 16.37; S, 9.35; M. W., 342.3. Found: C, 71.31, 71.12; H, 4.26, 4.32; N, 15.59, 15.63; S, 8.77; M. W., 330, 370.

The infrared spectrum had bands at $3.1\mu$ for NH; $4.5\mu$ for CN; and at 6.2, 6.25, 6.35 and $6.7\mu$ for C=C, and C=N. The UV spectrum had an absorption maximum at 362 m$\mu$ with a specific extinction coefficient of 43 and a calculated molar extinction coefficient of 14,700.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A substituted pyrrole in which one of the nuclear carbon atoms bonded to nuclear nitrogen bears an amino group of the formula —$NH_2$, the other nuclear carbon atom bonded to nuclear nitrogen bears a mercapto group, one of the remaining nuclear carbon atoms bears a cyano group and the other remaining nuclear carbon atom bears a group of not more than 5 carbon atoms which is directly bonded to said remaining nuclear carbon atom by carbon which is further bonded solely to from one to two elements of atomic number 7 to 8 and is multiply bonded to one of these elements.

2. A substituted pyrrole in which one of the nuclear carbon atoms bonded to nuclear nitrogen bears an amino group of the formula —$NH_2$, the other nuclear carbon atom bonded to nuclear nitrogen bears a hydrocarbon substituted mercapto group of not more than 7 carbon atoms and each of the remaining nuclear carbon atoms bears a cyano group.

3. A substituted pyrrole in which one of the nuclear carbon atoms bonded to nuclear nitrogen bears an amino group of the formula —$NH_2$, the other nuclear carbon atom bonded to nuclear nitrogen bears a hydroxyhydrocarbon substituted mercapto group of not more than 7 carbon atoms and each of the remaining nuclear carbon atoms bears a cyano group.

4. 2-amino-3,4-dicyano-5-mercaptopyrrole.

5. 2-amino-3,4-dicyano-5-(beta-hydroxyethylmercapto) pyrrole.

6. 2-amino-3,4-dicyano-5-phenylmercaptopyrrole.

7. 2-amino-3,4-dicyano-5-methylmercaptopyrrole.

8. Process for preparing substituted pyrroles which comprises heating at an elevated temperature above 65° C. under basic conditions a substituted thiophene in which each of the nuclear carbon atoms bonded to nuclear sulfur bears an amino group of the formula —$NH_2$, and each of the remaining nuclear carbon atoms bears a cyano group.

9. Process for preparing substituted pyrroles as set forth in claim 8 wherein said substituted thiophene is heated at an elevated temperature above 65° C. under basic conditions in the presence of an alkylating reagent selected from the class consisting of haloalkanols of not more than seven carbon atoms and of one halogen atom and that having an atomic number of at least 17 and halohydrocarbons of not more than seven carbon atoms and of not more than two halogen atoms with no more than one of said halogens attached to any one carbon atom, each of said halogens having an atomic number of at least 17.

10. Process for preparing substituted pyrroles which comprises heating at an elevated temperature a substituted butadiene in which each of the terminal carbon atoms of the butadiene nucleus bears an amino group of the formula —$NH_2$ and an arylmercapto group of not more than 7 carbon atoms and each of the central carbon atoms of the butadiene nucleus bears a cyano group.

11. Process for preparing substituted pyrroles as set forth in claim 10 wherein said substituted butadiene is heated in the presence of a mineral acid.

12. Process for preparing 2-amino-3,4-dicyano-5-phenylmercaptopyrrole which comprises heating at an elevated temperature in the presence of a mineral acid 1,4-diamino-2,3-dicyano-1,4-di(phenylmercapto)butadiene.

13. Process for preparing substituted pyrroles which comprises reacting 2-amino-3,4-dicyano-5-mercaptopyrrole with an alkylating compound selected from the class consisting of haloalkanols of not more than seven carbon atoms and of one halogen atom and that having an atomic number of at least 17 and halohydrocarbons of not more than seven carbon atoms and of not more than two halogen atoms with no more than one of said halogens attached to any one carbon atom, each of said halogens having an atomic number of at least 17.

14. Process for preparing substituted pyrroles which comprises reacting 2-amino-3,4-dicyano-5-mercaptopyrrole with a haloalkanol of not more than seven carbon atoms and of one halogen atom and that having an atomic number of at least 17.

15. Process for preparing substituted pyrroles which comprises reacting 2-amino-3,4-dicyano-5-mercaptopyrrole with a halohydrocarbon of not more than seven carbon atoms and of not more than two halogen atoms with no more than one of said halogens attached to any one carbon atom, each of said halogens having an atomic number of at least 17.

16. Process for preparing 2-amino-3,4-dicyano-5-(beta-hydroxyethylmercapto)pyrrole which comprises reacting 2-amino-3,4-dicyano-5-mercaptopyrrole with beta-chloroethanol.

17. Process for preparing 2-amino-3,4-dicyano-5-ethylmercaptopyrrole which comprises reacting 3-amino-3,4-dicyano-5-mercaptopyrrole with methyl iodide.

18. A substituted pyrrole having the formula

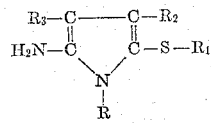

wherein at least one of the radicals $R_2$ and $R_3$ is the cyano group, the other of said radicals $R_2$ and $R_3$ is a radical of not more than five carbon atoms selected from the class consisting of the cyano, the carbamyl, alkoxycarbimido and alkoxycarbimido hydrochloride salt radicals, $R_1$ is selected from the class consisting of hydrogen, hydrocarbon radicals of not more than seven carbon atoms, carboxyalkyl of not more than seven carbon atoms, and hydroxyhydrocarbon radicals of not more than seven carbon atoms, and R is selected from the class consisting of hydrogen, lower alkyl groups and lower alkylene groups which together with $R_1$ form a lower alkylene chain.

19. A substituted pyrrole having the formula

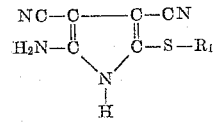

wherein $R_1$ is an alkyl group of not more than seven carbon atoms.

20. A substituted pyrrole having the formula

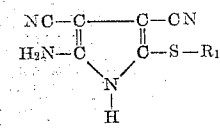

wherein $R_1$ is a hydroxyalkyl group of not more than seven carbon atoms.

References Cited in the file of this patent

UNITED STATES PATENTS

| | | |
|---|---|---|
| 2,527,165 | Walker et al. | Oct. 24, 1950 |
| 2,580,738 | De Benneville et al. | Jan. 1, 1952 |
| 2,733,260 | Howard, Jr. | Jan. 31, 1956 |

FOREIGN PATENTS

| | | |
|---|---|---|
| 518,160 | Great Britain | Feb. 19, 1940 |